Oct. 15, 1963
W. E. GREENE
3,107,108
TUBE COUPLING
Filed Nov. 26, 1957
3 Sheets-Sheet 1
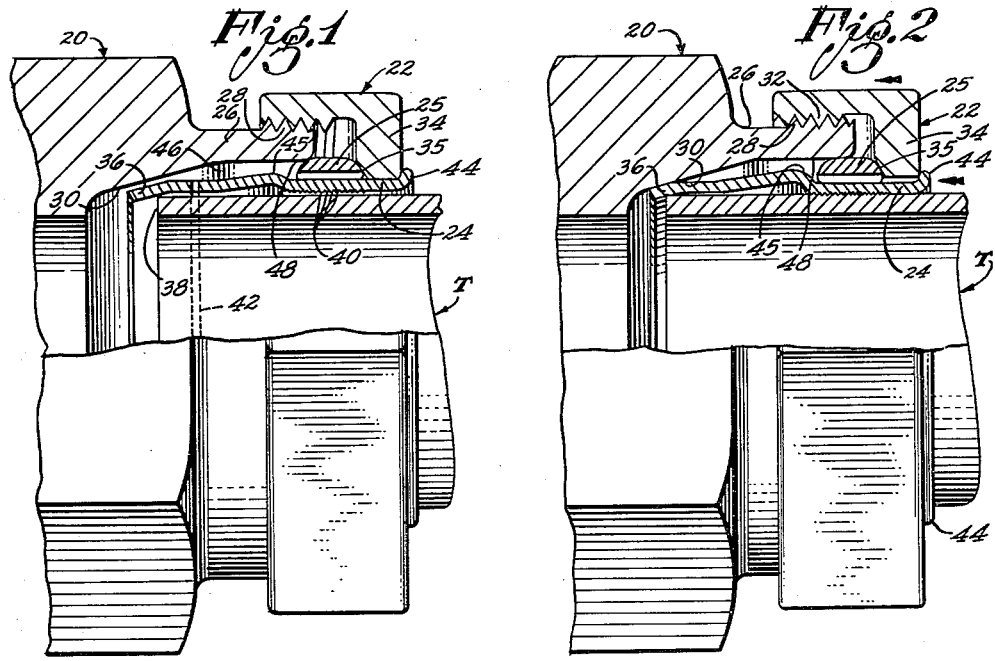
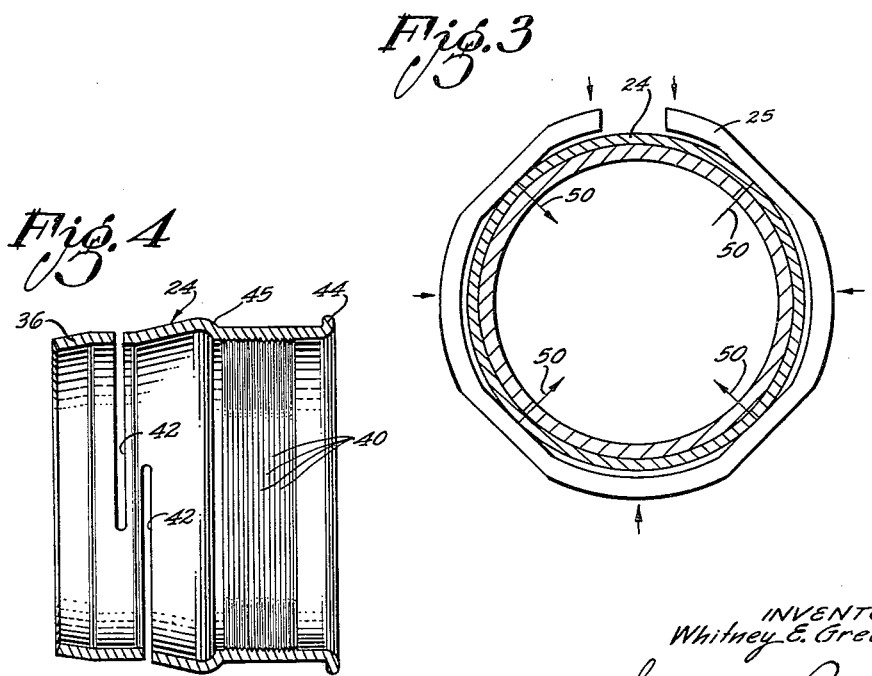
INVENTOR
Whitney E. Greene
By Smyth + Roston
Attorneys, Oct. 15, 1963 W. E. GREENE 3,107,108
TUBE COUPLING Filed Nov. 26, 1957 3 Sheets-Sheet 2

INVENTOR:
Whitney E. Greene

By Smyth & Roston
Attorneys

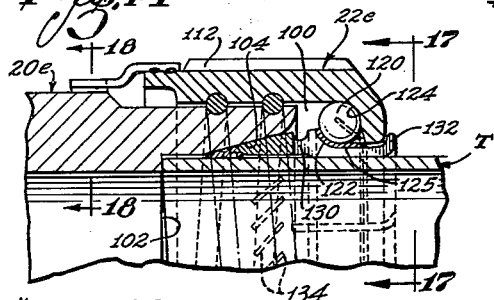
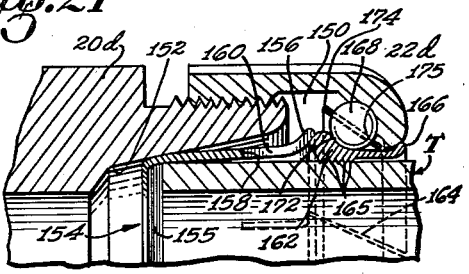
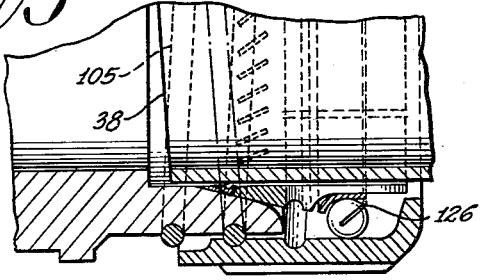
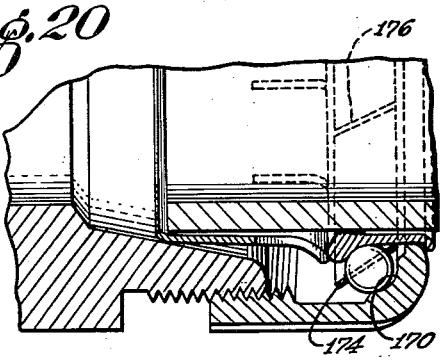
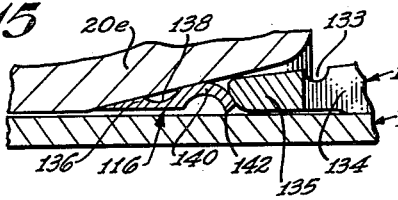
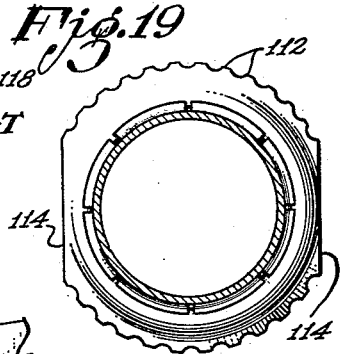
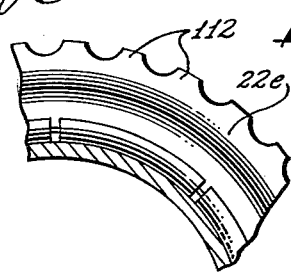
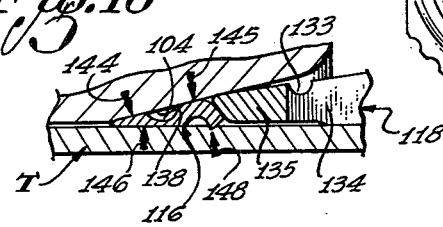
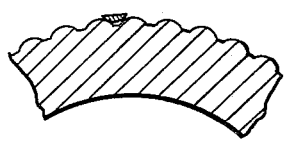

United States Patent Office 3,107,108
Patented Oct. 15, 1963

3,107,108
TUBE COUPLING
Whitney E. Greene, 712 S. Wilton Place, Apt. 404,
Los Angeles, Calif.
Filed Nov. 26, 1957, Ser. No. 699,131
9 Claims. (Cl. 285—341)

This invention relates to a coupling assembly for connecting a plain unthreaded tube to a fluid passage member such as a second similar tube or some type of pipe or conduit fitting.

The coupling assembly of the invention is of the general type in which two coupling bodies are adapted for screw threaded engagement with each other for screw-tightening action to effect the required fluid-tight seal around the plain tube. The screw-tightening action between the two coupling bodies is utilized to cause the tube to be gripped in a positive manner to prevent withdrawal of the tube and is further utilized to create an effective seal around the tube.

The invention is characterized by the employment of an annular means which surrounds the plain end of the tube inside the two coupling bodies, the annular means being resiliently radially contractible into gripping engagement with the tube and being also resiliently axially contractible. The screw-tightening action of the two coupling bodies provides a cam action to cause radial contraction of the annular means into engagement with the tube and the axial resiliency of the annular means permits it to be axially compressed in the course of the sealing action. In some practices of the invention, the axial resiliency of the annular means is of special importance in providing a spring action which prevents loosening of the sealing by vibration and in some applications the same spring action is also of special importance in maintaining the effectiveness of the seal by compensating for thermal expansion and contraction of the cooperating parts.

The two coupling bodies jointly form a variable annular chamber around the tube which is axially contracted by the screw-tightening action to provide the required cam action against the annular means. In some practices of the invention, the cam action is carried out simply by a cam surface of the chamber itself. A feature of other practices of the invention, however, is the use of a circumferential series of balls to carry out the camming operation, the balls rolling in an inner circumferential race in the chamber. This feature permits the screw-tightening action and the resulting cam action to be carried out with minimum effort in the assembly of the tube joint. The balls may even make it possible to tighten the assembly effectively by hand without the use of a tool.

Under these broad concepts, the seal around the tube end may be effected in various ways. In one practice of the invention, for example, a sealing gasket is interposed between the end of the tube and an opposing radial shoulder of one of the coupling bodies. In another practice of the invention, one of the coupling bodies has a tapered inner circumferential wall and the seal is effected by forcing the tube end against this tapered circumferential wall with a wedging action. In further practices of the invention, the radially and axially contractible annular means itself serves as a seal.

The radially and axially contractible annular means may also take various forms and various practices of the invention. In some practices of the invention, for example, the contractible annular means comprises simply a single discontinuous member surrounding the tube and contractible to grip the tube, the single member having a broken or roughened inner circumferential surface for positive engagement with the tube. To provide the yielding resistance to axial contraction required for the cam action for gripping the tube and also required to permit continued screw-tightening action between the two coupling bodies, this single member is formed into a resilient coil for axial compression in the manner of a coil spring.

In other practices of the invention, the contractible annular means is an assembly comprising a thin-walled sleeve and a cooperating annular member. The thin-walled sleeve extends between the tube and the tapered inner circumferential wall of one of the coupling members to serve as a seal therebetween and the cooperating annular member is subjected to the cam action for radial contraction as required for gripping and moving the tube into sealing position.

In one of these latter practices of the invention, the thin-walled sleeve itself is both radially contractible to grip the tube and axially contractible to permit the relative axial movement of the tube, the cooperating annular member functioning merely as cam means for radial inward action against the sleeve. In another of these practices, the cooperating annular member itself cams into gripping relation with the tube and the axial contraction consists of the cooperating annular member telescoping into the outer end of the sleeve. In still another of these practices of the invention, the thin-walled sleeve functions solely as a wedging sealing member and is relatively rigid, the radial contraction for gripping action on the tube and the yielding axial compression being provided by a cooperating resilient annular member of coiled configuration.

In an additional practice of the invention under another concept, the annular means includes a special thin replaceable sealing ring and an annular follower that is advanced edgewise against the band by cam action. The advancing edge of the special sealing ring wedges around the tube in a sealing manner and the trailing edge is bowed longitudinally and turned radially inward to bite into the tube for positive grip to prevent withdrawal of the tube.

The various features and advantages of the invention will be apparent from the following detailed description in conjunction with the accompanying drawings.

In the drawings, which are to be regarded as merely illustrative:

FIG. 1 is a view partly in side elevation and partly in longitudinal section showing a preferred embodiment of the invention at the beginning of the screw-tightening action;

FIG. 2 is a similar view of the same embodiment at the end of the screw-tightening action;

FIG. 3 is a view partly in section and partly in elevation showing how a contractible annular means of this first embodiment of the invention comprising a thin-walled sleeve and a cooperating surrounding annular member embrace the tube, the tube and sleeve being shown in cross section and the surrounding annular member being shown in side elevation;

FIG. 4 is a longitudinal sectional view of the thin-walled sleeve of the first embodiment of the invention;

FIG. 13 is a longitudinal sectional view of a sixth embodiment of the invention showing the joint at an early stage in the screw-tightening action;

FIG. 14 is a similar view showing the parts at the end of the screw-tightening action;

FIG. 15 is an enlarged sectional view showing the configuration of the sealing ring of this embodiment of the invention prior to the screw-tightening action;

FIG. 16 is a similar view showing the configuration of the sealing ring at the end of the screw-tightening action;

FIG. 17 is a fragmentary sectional view taken as indicated by the line 17—17 of FIG. 14 showing a portion of the coupling assembly in end elevation;

FIG. 18 is a fragmentary transverse section taken as indicated by the line 18—18 of FIG. 14 and showing a detent arrangement that may be provided to resist unscrewing of the two coupling bodies;

FIG. 19 is an end elevation of the coupling assembly showing how one of the coupling bodies may be serrated for manual manipulation and may also be provided with a pair of flat faces for engagement by a wrench;

FIG. 20 is a longitudinal sectional view illustrating a seventh embodiment of the invention and showing the parts at an early stage in the screw-tightening action; and FIG. 21 is a similar view showing the parts at the end of the screw-tightening action.

Figure 5:
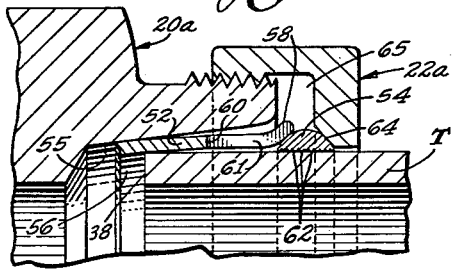
FIG. 5 is a longitudinal sectional view illustrating a second embodiment of the invention in which the contractible annular means comprises a thin-walled sleeve and a cooperating annular member that telescopes into the end of the sleeve, the view being taken at an intermediate stage in the screw-tightening action of the two coupling bodies.

The first embodiment of the invention illustrated by FIGS. 1 to 4 is a tube coupling assembly that includes a first coupling body 20, a second coupling body 22 and a radially and axially contractible annular means comprising a thin-walled sleeve 24 together with a cooperating surrounding annular member in the form of a split ring 25. The first coupling body 20, which may be of hexagonal peripheral configuration as indicated, has a reduced cylindrical end portion 26 that is formed with an external screw thread 28. This first coupling body is also formed with an inner circumferential sealing surface 30 that is tapered or conically curved for sealing cooperation with the inner end of the thin-walled sleeve 24. The second coupling body 22 has an internal screw thread 32 to engage the external screw thread 28 and is formed with a radially inward flange 34 that loosely embraces the thin-walled sleeve 24. The second coupling body 22 is also formed with an inner chamfer 35 to abut the split ring 25.

The thin-walled sleeve 24 has a tapered inner end portion 36 to mate with the tapered sealing surface 30 in a wedging manner and to overhang the end rim 38 of a piece of tubing that is generally designated by the letter T. The thin-walled sleeve 24 has a broken or rough inner circumferential surface near its outer end for gripping the tube T and for this purpose may be formed with minute inner circumferential ribs 40 as best shown in FIG. 4.

The thin-walled sleeve 24 is radially contractible in the sense that it is sufficiently resilient to be flexed inward in response to radial inward pressure applied at widely spaced circumferential points. Thus, the thin-walled sleeve 24 may be dimensioned to slip over the tube T and then to be squeezed at circumferentially spaced points into positive gripping engagement with the tube. The thin-walled sleeve 24 is also axially contractible and for this purpose is formed with spaced overlapping transverse slots 42, each of which extends over somewhat more than 180 degrees of the circumference of the sleeve. Thus, after the outer end of the sleeve is clamped into gripping engagement with the tube T, the sleeve may be axially contracted to the required degree by at least partial closing of the overlapping slots 42.

The thin-walled sleeve 24 is further formed with a radial lip 44 at its outer end and is enlarged to form a circumferential shoulder 45 that is spaced inwardly from the radial lip. The split ring 25 embraces the thin-walled sleeve 24 between the circumferential shoulder 45 and the radial lip 44, and the radially inward flange 34 of the second coupling body 22 embraces the thin-walled sleeve between the split ring 25 and the radial lip. Preferably, the dimensional relationships are such that the second coupling body 22 rotatably retains the thin-walled sleeve 24 and the split ring 25 so that the second coupling body, the thin-walled sleeve and the split ring comprise a unit, the parts of which stay together prior to the application of the tube coupling assembly to a tube.

In the various embodiments of the invention, the two coupling bodies form an annular chamber around the contractible annular means, which chamber contracts axially when the screw-tightening action between the two coupling bodies occurs. In all embodiments of the invention, cam means is provided in the axially contractible annular chamber to cause radial contraction of the annular means by cam action in response to the screw-tightening action.

In this first embodiment of the invention, the annular chamber is indicated by numeral 46 and the cam means in the chamber is an inner circumferential cam surface 48 at the leading end of the first coupling body 20. This inner camming surface 48 cooperates with the split ring 25 in a manner that may be understood by comparing FIGS. 1 and 2. It is apparent from a comparison of these two figures that the screw-tightening action between the two coupling bodies causes the chamber 35 of the second coupling body 22 to engage the split ring 25 and force the split ring to telescope into the cam surface 48 with consequent radial contraction of the split ring. Preferably, the outer circumferential surface of the split ring 25 is rounded, as shown, for cooperation both with the chamber 35 and with the cam surface 48.

As shown in FIG. 3, the split ring 25 is of noncircular configuration to make contact with the periphery of the thin-walled sleeve 24 at four equally spaced circumferential points. Radial contraction of the split ring 25 by the cam action causes radially inward pressure by the split ring against the thin-walled sleeve 24 at four points as indicated by the four arrows 50 in FIG. 3. Since the thin-walled sleeve 24 is resiliently flexible enough to bend inward locally at these four points, the fine inner ribs 40 of the thin-walled sleeve grip and dig into the surface of the tube T at these four points.

The continued screw-tightening action between the two coupling bodies 20 and 22 after the thin-walled sleeve 24 grips the tube may continue with the split ring sliding along the periphery of the thin-walled sleeve towards the peripheral shoulder 45 but the sliding action is stopped by the peripheral shoulder and thereafter the split ring engages the thin-walled sleeve in a positive manner to drive the outer end of the thin-walled sleeve axially inward.

As the screw-tightening action continues, the tapered inner end portion 36 of the thin-walled sleeve 24 mates with the tapered inner circumferential sealing surface 30 of the first coupling body 20, relative axial movement between the tube T and the first coupling body occurring in the meantime. After the inner tapered end portion 36 of the thin-walled sleeve 24 mates with the tapered inner circumferential sealing surface 30, continued tightening action of the two coupling bodies 20 and 22 causes axial contraction of the thin-walled sleeve until the inward relative movement of the tube T relative to the coupling body 20 is terminated by forceful wedging engagement of the end rim 38 of the tubing with the surrounding tapered inner end portion of the thin-walled sleeve. Thus, at the final sealing position of the tube T relative to the coupling body 20, the tapered inner end portion 36 of the thin-walled sleeve 24 is interposed as a seal between the tube end and the tapered inner circumferential sealing surface 30 with the tube end wedging into the tapered inner end portion 36 of the thin-walled sleeve 24, and with this tapered inner end portion, in turn, wedging into sealing engagement with the tapered sealing surface 30.

The assembled coupling may be loosened and disengaged from the tubing T in a simple manner whenever desired. It is apparent that unscrewing and withdrawing the coupling body 22 from the coupling body 20 causes the radially inward flange 34 of the coupling body 22 to move against the radial lip 44 of the thin-walled sleeve 24 to force the outer end of the thin-walled sleeve axially outward. The initial axially outward movement of the radial lip 44 causes the thin-walled sleeve 24 to expand axially with consequent retraction movement of the tube T relative to the coupling body 20 to withdraw the tube from wedging engagement with the thin-walled sleeve. Continued axially outward movement of the radial lip 44 causes the thin-walled sleeve to move bodily axially outward to drag the split ring 25 with it until the split ring moves out of engagement with the inner cam surface 48. The split ring 25 then expands radially to permit corresponding radial expansion of the thin-walled sleeve 24 for complete release of the sleeve from the tubing.

Figure 6:
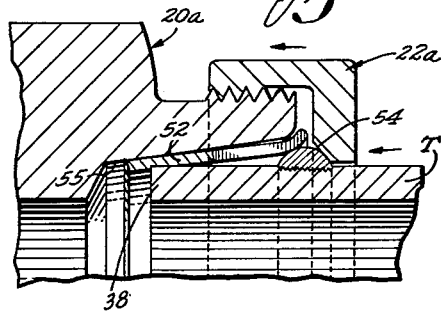
FIG. 6 is a view similar to FIG. 5 showing the parts at the end of the screw-tightening action.

The second embodiment of the invention shown in FIGS. 5 and 6 is a tube coupling assembly that includes a first coupling body 20a, a second coupling body 22a and a contractible annular means comprising a thin-walled sleeve 52 and a cooperating annular member in the form of a split ring 54. The two coupling bodies 20a and 22a screw together in the usual manner and the first coupling body 20a is formed with a tapered inner circumferential sealing surface 55. The thin-walled sleeve 52 has a tapered inner end portion 56 to mate with the tapered sealing surface 55 and is formed with a flare 58 at its outer end. The outer end of the thin-walled sleeve 52 is formed with a plurality of circumferentially spaced longitudinal slots 60 so that the outer end of the thin-walled sleeve comprises a circumferential series of flexible tongues 61 with flared ends.

The split ring 54 may either be of circular configuration or may be noncircular in configuration, as heretofore described, for radial contraction against the periphery of the tube T. The split ring is formed with an inner circumferential surface of rough or broken configuration for positive gripping engagement with the tube. In his instance, the split ring 54 is circular and is formed with fine circumferential gripping ribs 62. The split ring 54 is of rounded tapered cross-sectional configuration, as shown, for abutment against an inner chamfer 64 of the coupling body 22a and for cooperation with the slotted outer end of the thin-walled sleeve 52. Thus, the rounded split ring 54 partially nests or telescopes into the outer end of the thin-walled sleeve 52 when the split ring is advanced axially towards the thin-walled sleeve.

The two coupling bodies 20a and 22a form an inner axially contractible chamber 65 having a camming surface which comprises the chamfer 64. At an early stage in the screw-tightening action of the two coupling bodies 20a and 22a, the chamfer 64 cams the split ring 54 radially inward, this camming action being assisted by the resistance on the part of the thin-walled sleeve 52 against inner axial movement of the split ring. The radial contraction of the split ring 54 causes the split ring to grip the tube T in a positive manner whereupon continuation of the screw-tightening action shifts the tube axially inward relative to the coupling body 20a until the inner end rim 58 of the tube wedges into sealing engagement with the thin-walled sleeve 52 and causes the thin-walled sleeve, in turn, to wedge in sealing engagement with the tapered inner circumferential sealing surface 55. During this last stage of the screw-tightening action, the annular means comprising the thin-walled sleeve 52 and the split ring 54 contracts by virtue of the fact that the split ring progressively telescopes into the thin-walled sleeve with consequent flexing of the tongues at the inner end of the sleeve, as may be seen by comparing FIGS. 5 and 6.

Figure 7:
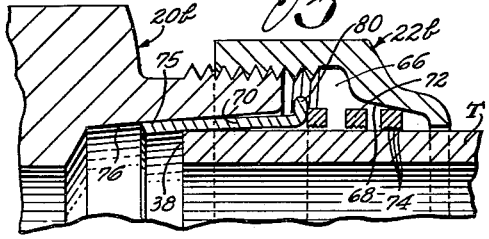
FIG. 7 is a longitudinal cross-sectional view illustrating a third embodiment of the invention in which the contractible annular means comprises a thin-walled sleeve and a cooperating annular member of the configuration of a coil spring, the view being taken at an intermediate stage in the screw-tightening action.
Figure 8:
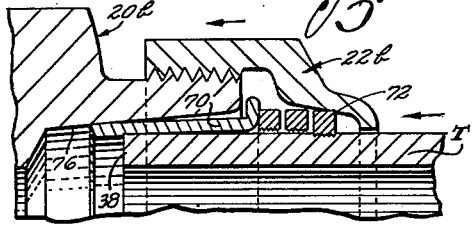
FIG. 8 is a view similar to FIG. 7 showing the parts a the end of the screw-tightening action.

In the third embodiment of the invention shown in FIGS. 7 and 8, a first coupling body 20b and a second coupling body 22b form a chamber 66 which presents a cam surface 68. The contractible annular means comprises a thin-walled sleeve 70 and a cooperating annular member in the form of a resilient coiled member 72. The inner circumferential surface of the coiled member is provided with minute sharp ribs 74 for positive biting engagement with the tube T. The coiled member 70 is circular but may be noncircular in configuration. The thin-walled sleeve 70 has the usual tapered inner end portion 75 to mate with a tapered inner circumferential sealing surface 76 of the first coupling body 20b. The outer end of the thin-walled sleeve 70 is formed with a radial flange 80 for abutment against the inner end of the coiled member 72.

At an early point in the screw-tightening action of the two coupling bodies 20b and 22b, the cam surface 68 cams the adjacent turn of the coiled member 72 into positive biting engagement with the tube T, this camming action being facilitated by the resistance of the coiled member to longitudinal compression as the chamber 66 contracts. The longitudinal compression of the coiled member 72 creates axial force against the thin-walled sleeve 70 to urge the sleeve axially against the tapered inner circumferential sealing surface 76.

As the screw-tightening action continues with the first turn of the coiled member 74 in positive engagement with the tube T, the tube is advanced axially inward into sealing engagement with the tapered inner end portion 75 of the sleeve 70, the end rim 38 of the tube digging slightly into the material of the sleeve as may be seen in FIG. 8. Thus, the seal is accomplished with a wedging action of the tube end against the thin-walled sleeve 70 and wedging action on the part of the thin-walled sleeve against the surrounding tapered inner circumferential sealing surface 76. The radial flange 80 of the thin-walled sleeve 70 may be easily engaged by a suitable tool for prying action to retract the sleeve whenever it is desirable to dismantle the coupling.

Figure 9:
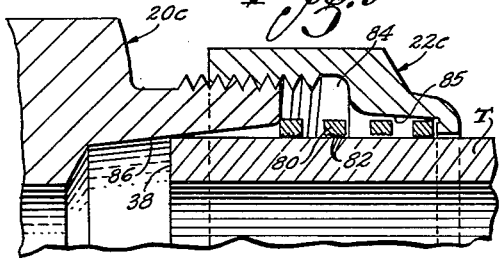
FIG. 9 is a longitudinal sectioinal view of a fourth embodiment of the invention in which the contractible annular means comprises a single annular member of coiled configuration, the view being taken at an intermediate stage in the screw-tightening action.
Figure 10:
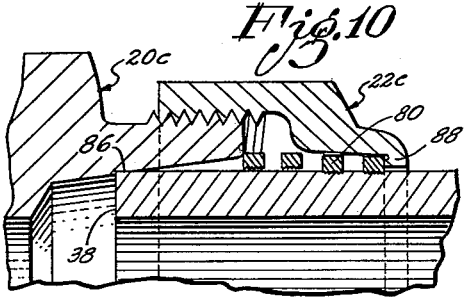
FIG. 10 is a similar view showing the parts at the end of the screw-tightening action.

The fourth embodiment of the invention illustrated by FIGS. 9 and 10 comprises a first coupling body 20c, a second coupling body 22c and an axially and radially contractible annular means in the form of a coiled resilient member 80. The coiled resilient member 80 abuts the end of the coupling body 20c and has inner circumferential ribs or teeth 82 for positive biting engagement with the tube T. The two coupling bodies 20c and 22c form a variable chamber 84 which presents an inner circumferential cam surface 85.

In this embodiment of the invention, the seal around the tube T is accomplished by forcing the end rim 38 of the tube axially against a tapered inner circumferential sealing surface 86 of the first coupling body 20c. The coiled resilient member 80 is of noncircular configuration for resilient cam action to bite into the tube T at circumferentially spaced points, but may be circular if desired.

At least one turn of the coiled member 80 is cammed into abutting engagement with the tube T. In this instance, as shown in FIG. 9, two turns are cammed radially inward. The cam surface 85 is formed with a longitudinal dwell that permits the cam surface to slide over the radially contracted turns of the coiled member 80. FIG. 10 shows how this sliding axial movement between the second coupling body 22c and the radially contracted turns of the coiled member 80 is terminated when a radially inward flange 88 of the second coupling body 22c reaches and abuts the outermost turn of the coiled member. Continued screw-tightening action between the two coupling bodies beyond this point results in axial movement of the end rim 38 of the tube T inward into sealing engagement with the sealing surface 86, the coiled resilient member 80 axially contracting to permit the tube movement.

Figure 11:
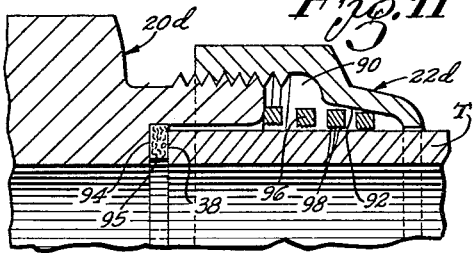
FIG. 11 is a longitudinal sectional view of a fifth embodiment of the invention which differs from the fourth embodiment in the employment of a yielding gasket as a sealing member, the view being taken at an intermediate stage in the screw-tightening action.
Figure 12:
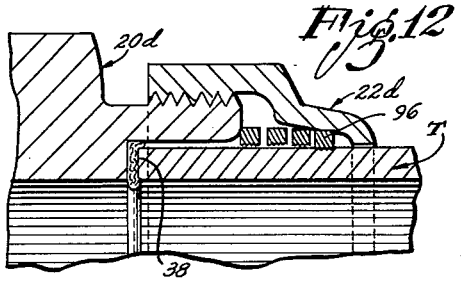
FIG. 12 is a view similar to FIG. 11 showing the parts at the end of the screw-tightening action.

In the fifth embodiment of the invention illustrated by FIGS. 11 and 12, a first coupling body 20d and a second coupling body 22d form an annular camming 90 that presents an inner circumferential cam surface 92. In this instance, the cam surface 92 is uniformly tapered instead of being formed with a longitudinal dwell. The first coupling body 20d is formed with an inner circumferential shoulder 94 which cooperates with the end rim 38 of the tube T to place a suitable gasket 95 under sealing pressure.

The contractible annular means comprises a single resilient coiled member 96, the inner end of which abuts the end of the first coupling body 20d and the outer end of which cooperates with the cam surface 92. Here again, the coiled member 96 is preferably, but not necessarily, noncircular and is provided with circumferential teeth or biting ribs 98. Early in the screw-tightening action of the two coupling bodies, the outermost turn of the coiled member 96 bites into the tube T and since the cam surface 92 is not formed with a dwell, the tube T is immediately forced axially inward into sealing pressure against the gasket 95, as shown in FIG. 12, the coiled member 96 contracting axially to permit this tube movement.

The embodiment of the invention shown in FIGS. 14 to 19 is a coupling assembly that includes a first annular coupling body 20e, a second coupling body 22e that form a variable chamber 100 around the tube T. The first coupling body 20e is formed with an inner circumferential shoulder 102 for abutment by the end of the tube T and is further formed with a tapered inner circumferential sealing surface 104.

For the purpose of interconnecting the two coupling bodies in a screw-threaded manner for the required screw-tightening action, the second coupling body 22e is formed with an inner circumferential helical groove 105 of circular curved cross-sectional configuration and suitably dimensioned hard metal balls 106 are bonded to the peripheral surface of the first coupling body 20e for engagement with the helical groove. The balls 106 may be brazed in place and the balls may be at any suitable circumferential spacing. The circumferential spacing, for example, may be 90°, 60°, 45°, 22½°, etc.

Preferably, suitable detent means is provided to resist unscrewing of the two coupling bodies. For this purpose, the coupling body 20e may be provided with a circumferential series of relatively shallow detent teeth 108 and the coupling body 22e may be provided with a leaf spring detent finger 110 for yielding engagement with the teeth. Manual rotation of the second coupling body 22e may be facilitated by providing the coupling body with a serrated or knurled peripheral surface. For example, the coupling body may be formed with a circumferential series of longitudinal ribs 112. Preferably, as shown in FIG. 21, the coupling body 22e is also provided with a pair of diametrically opposite flat faces 114 for engagement by a wrench.

The annular means in this embodiment of the invention comprises a special sealing ring 116 and a tapered follower sleeve 118 for axial movement against the ring. In this practice of the invention, the means to carry out the cam action in the variable chamber 100 comprises a series of circumferential balls 120 which act against a circumferential shoulder or abutment 122 of the follower sleeve 118. The coupling body 22e is formed with an inner circumferential race 124 for the balls 120 and preferably a second race for the balls is provided in the form of a thin tapered continuous ring 125. This race ring 125 conforms to the peripheral configuration of the follower sleeve 118 including the tapered configuration of the shoulder 122. The balls 120 may be spaced apart by a suitable spacer means 126 in a manner well known in ball-bearing structures. The space means 126 may, for example, be a suitably bent wire.

The tapered follower sleeve 118 has a flared rim at its outer end and is also provided with longitudinal slots 130 at its outer end that form flexible tongues 132 to make the follower sleeve radially contractible. Preferably, the follower sleeve 118 is further formed with a circumferential groove 133 at the base of the tongues 132 to lend a desirable degree of flexibility to the tongues. The follower sleeve is further provided with a circumferential series of overlapping slanted slots 134 which make the follower sleeve axially contractible whereby the sleeve may function as a longitudinally compressible spring. The inner end of the follower sleeve 118 is of rounded tapered configuration to form a tapered camming nose 135 (FIGS. 15 and 16) for cooperation with the sealing ring 116. As shown in FIG. 15, the special sealing ring 116 has a thin tapered leading end 136, a circumferential peripheral groove 128 and a trailing portion 140 of arcuate configuration. The arcuate trailing portion has a radially inwardly directed circumferential edge 142 to bite into the material of the tube T. The sealing ring 116 may be made of any suitable material, for example, phosphor bronze.

At the beginning of the screw-tightening action of the two coupling bodies 20e and 22e, the series of balls 120 are rotated into pressure engagement with the race ring 125 and the ball ring is advanced against the abutment 122 of the follower sleeve 118 with a cam action which causes the follower sleeve to contract radially against the tube T by flexure of the tongues 132. The grip by the follower sleeve 118 on the tube T is not positive, however, and the continued screw-tightening action causes the balls 120 and the race ring 125 to urge the follower sleeve 118 axially against the special sealing ring 116.

The axial force exerted by the balls 120 causes axial compression of the follower sleeve 118 with yielding action by the overlapping inclined slots 134. Consequently, the camming nose 135 exerts increasing pressure against the trailing end of the sealing ring 116 as the screw-tightening action progresses. As the follower sleeve 118 presses against the sealing ring 116, the thin tapered leading end 136 of the sealing ring is wedged into sealing pressure between the tube and the sealing surface 104 of the coupling body 20e. A final result of the continued and increasing axial pressure of the follower sleeve 118 against the sealing ring 116 is to cause the arcuate trailing portion 140 of the sealing ring to be bowed inwardly into biting or penetrating engagement with the tube T. Thus, as may be seen in FIGS. 15 and 16, the camming nose 135 of the follower sleeve 118 causes the circumferential edge 142 of the sealing ring to bite into the tube T and at the same time causes the sealing ring to arch radially outward against the tapered sealing surface 104 of the coupling body 20e.

The ultimate result of the tightening action of the two coupling bodies is that the sealing ring 116 makes sealing contact with the tapered sealing surface 104 at two axially spaced annular zones indicated by the arrows 144 and 145 in FIG. 16 and makes sealing contact with the tube T at two spaced annular zones indicated by the arrows 146 and 148. In addition, the sealing ring 116 positively grips the tube T by penetrating into the material of the tube at the annular sealing zone 148 to prevent retraction of the tube. A further ultimate result of the tightening action of the two coupling bodies is that the follower sleeve 118 is permanently yieldingly stressed in axial compression to function as a compressed spring for maintaining pressure on the sealing ring 116. This spring action provides compensation for thermal expansion and contraction of the parts and the sliding grip of the flexible tongues 132 on the tube avoids interference with thermal expansion and contraction.

If the end of the tube T is not in abutment against the inner circumferential shoulder 102 of the coupling body 20e at the start of the screw-tightening action of the two coupling bodies, the frictional engagement of the tongues 132 of advancing follower sleeve 118 with the tube will immediately advance the tube against the inner circumferential shoulder. An important advantage of this practice of the invention is that the end of the tube T need not be cut accurately. Thus, FIG. 1 shows that the tube rim 38 is not normal to the axis of the tube.

The described coupling assembly inherently resists vibration. Residual resiliency in the special sealing ring 116 is helpful in this regard since the trailing portion of the ring is bowed between the tube and the surrounding coupling body 20e. The spring action of the follower sleeve 118 also resists vibration. Finally, the manner in which the flexible tongues 132 grip the tube resists vibration.

In the last embodiment of the invention shown in FIGS. 20 and 21, the coupling assembly includes a first coupling body 20d and a second coupling body 22d for cooperation to form a variable annular chamber 150. The two coupling bodies are in screw-threaded engagement with each other and the coupling body 22d may have the previously described peripheral configuration shown in FIG. 19 whereby the coupling body may be rotated either by hand or by means of a wrench. The first coupling body 20d is formed with a tapered inner circumferential sealing surface 152.

The annular means in the annular chamber of this last embodiment of the invention includes a thin-walled sleeve 154 that is substantially identical to the previously described thin-walled sleeve 52 employed in the second embodiment of the invention shown in FIGS. 5 and 6. Thus, the thin-walled sleeve 154 has a tapered inner end portion 155 for cooperation with the tapered sealing surface 152 and the opposite end of the thin-walled sleeve has a flare 156 with longitudinal slots 158 extending through the flare to form flexible tongues 160.

The annular means inside the variable annular chamber 150 further includes a split ring 162 which is functionally equivalent to the previously described split ring 64 in FIGS. 5 and 6. The split ring 162 is preferably split diagonally as indicated at 164. The split ring 162 has fine circumferential ribs or teeth 165 for biting engagement with the tube T and is further formed with a rearwardly extending lip 166 which is rotatably engaged by the coupling body 22d.

The means in the variable annular chamber 150 for cam action against the split ring 162 comprises a plurality of circumferentially spaced balls 168 that roll in an inner circumferential ball race 170 of the coupling body 22d. When the screw-tightening action of the two coupling bodies is initiated, the balls 168 cam against an inclined circumferential shoulder or abutment 172 of the split ring 162 to contract the split ring into biting engagement with the tube T. Continued screw-tightening action causes the balls 168 to shift the contracted split ring 162 axially with consequent axially inward shifting of the tube T until the tube makes sealing wedging engagement with the thin-walled sleeve 160 and the thin-walled sleeve, in turn, makes wedging sealing engagement with the tapered inner circumferential surface 152. During this advancement of the tube to its final sealing position, the annular means comprising the thin-walled sleeve 160 and the split ring 162 contracts axially by the split ring telescoping into the thin-walled sleeve, the split ring sliding under the flexible tongues 160.

A feature of this last embodiment of the invention is the employment of a dual-function spacer means 174 to maintain circumferential spacing of the balls 168. The spacer 174 is a resiliently flexible conically curved split band having apertures 175 to seat against the corresponding balls 168. The apertures 175 are of smaller dimension than the diameter of the balls and the resilient spacer means 174 is split as indicated at 176 in FIG. 20 and is biased to urge the balls continuously radially outward. An advantage of this arrangement is that since the balls are urged radially outward they readily pass over the gap at the split 164 of the split ring 162.

It is apparent that in all forms of the invention the coupling assembly may be salvaged for reuse and usually may be used several times. In the first three embodiments of the invention, the thin-walled sleeve prevents deformation of the tapered inner circumferential sealing surface of the first coupling body. The thin-walled sleeve itself may be readily replaced but usually it is not necessary to do so when the coupling assembly is used a second time. The fifth embodiment of the invention may obviously be reused any number of times since the seal is accomplished by a yielding gasket which may be readily replaced. Reuse of the embodiment shown in FIG. 14 requires merely replacement of the small wedging sealing ring.

My description in specific detail of the selected embodiments of the invention will suggest various changes, substitutions and other departures from my disclosure within the spirit and scope of the appended claims.

I claim:

1. In a coupling assembly to engage the end of a tube, the combination of: a first annular threaded coupling body having a tapered inner circumferential wall to cooperate in the forming of a seal around the tube; a second annular coupling body threaded for engagement with said first body for relative axial movement of the two bodies towards each other by screw action, said two bodies being shaped in the region of their juncture to form a variable annular chamber around the tube, said chamber contracting axially with said screw action; and annular means to surround the tube in said annular chamber, said annular means being in the region adjacent its outer end resiliently radially contractible against the tube and also being between its two ends resiliently axially contractible, said annular means being tapered with a tapered inner circumferential surface at its inner end to overhang the end of said tube and with a tapered outer circumferential surface at its inner end for contact with said tapered inner circumferential wall of the first coupling body; and means in said variable chamber to engage said annular means with a cam action to contract the outer end of the annular means radially inward to grip the tube and to apply force axially to the annular means for axially contracting the annular means and shifting the tube axially for sealing action at said tapered inner circumferential wall of the first coupling body with the tapered end of the annular means in wedging contact with the tapered inner circumferential wall and with the end of the tube in wedging contact with the tapered inner circumferential surface of the annular means.

2. A coupling assembly as set forth in claim 1, in which said means in said cam chamber to engage said annular means with a cam action is a cam surface of said variable chamber.

3. A coupling assembly as set forth in claim 1, in which said second coupling body forms an inner circumferential ball race in said variable chamber; and in which said means in said chamber to engage said annular means with a cam action comprises a series of balls rotatably seated in said race.

4. In a coupling assembly to engage the end of a tube, the combination of: a first annular threaded coupling body having a tapered inner circumferential wall to cooperate in the forming of a seal around the tube; a second annular coupling body threaded for engagement with said first body for relative axial movement of the two bodies towards each other by screw action, said two bodies being shaped in the region of their juncture to form with the tube an annular camming chamber around the tube spaced from the tube end, said chamber contracting axially with said screw action; and annular means to surround the tube in said annular chamber inside said tapered inner circumferential wall of said first body, said annular means having an inner circumferential wall portion near its outer end of broken surface configuration to grip said tube in a positive manner in a region spaced from said end of the tube, said annular means being resiliently radially contractible for positive gripping action against said tube by said wall portion and also being resiliently axially contractible between its two ends, the other end of said annular means being engageable with said first body to resist axial contraction of the annular means when the annular means grips the tube, said annular means including a thin-walled sleeve to overhang the end rim of the tube to serve as a seal between said end rim and said tapered inner circumferential wall of the first coupling body, said sleeve being tapered for cooperation with said tapered wall, the annular wall of said annular chamber being shaped and dimensioned to engage said annular means with a cam action at an early stage in said screw action to contract the annular means radially into positive grip with the tube end to thereafter contract the annular means axially to force said tube end axially relative to said other end of the annular means for sealing action at said inner circumferential wall.

5. In a coupling assembly to engage the end of a tube, the combination of: a first annular threaded coupling body having a tapered inner circumferential sealing surface; a second annular coupling body threaded for engagement with said first body for relative axial movement of the two bodies towards each other by screw-tightening action, said two bodies being shaped in the region of their juncture to form with the tube an annular camming chamber around the tube, said chamber contracting axially with said screw-tightening action and presenting an inner circumferential cam surface; a thin-walled sleeve to embrace the tube inside said camming chamber, said thin-walled sleeve having an inner end portion with a tapered inner circumferential surface to overhang the end of the tube and a tapered outer circumferential surface to make sealing contact with said tapered sealing surface, the outer end of said sleeve being flared and having longitudinal slots forming flexible longitudinal tongues; and a split ring surrounding said tube adjacent the outer flared end of the sleeve, said split ring being radially contractible by said cam surface and having an inner surface of broken configuration for positive gripping engagement with the tube, whereby screw-tightening action of the two coupling bodies initially contracts said split ring to engage the tube for axial inward movement of the tube into sealing engagement with said overhanging tapered inner circumferential surface of the sleeve and to bring said tapered outer circumferential surface of the sleeve into sealing engagement with said tapered inner circumferential sealing surface, said split ring telescoping into the flared outer end of the sleeve in the course of this sealing action.

6. In a coupling assembly to engage the end of a tube, the combination of: a first annular threaded coupling body having a tapered inner circumferential wall to cooperate in the forming of a seal around the tube; a second annular coupling body threaded for engagement with said first body for relative axial movement of the two bodies towards each other by screw action, said two bodies being shaped in the region of their juncture to form with the tube an annular camming chamber around the tube spaced from the tube end, said chamber contracting axially with said screw action; and annular means to surround the tube in said annular chamber inside said tapered inner circumferential wall of said first body, said annular means having an inner circumferential wall portion near its outer end of broken surface configuration to grip said tube in a positive manner in a region spaced from said end of the tube, said annular means being resiliently radially contractible for positive gripping action against said tube by said wall portion and also being resiliently axially contractible between its two ends, the other end of said annular means being engageable with said first body to resist axial contraction of the annular means when the annular means grips the tube, the annular wall of said annular chamber being shaped and dimensioned to engage said annular means with a cam action at an early stage in said screw action to contract the annular means radially into positive grip with the tube end to thereafter contract the annular means axially to force said tube end axially relative to said other end of the annular means for sealing action at said inner circumferential wall, said annular means comprising a thin-walled radially contractible sleeve, the inner end of which overhangs said end rim of the tube to form a seal between the tube and said first body; and an annular member in contact with the outer end of said sleeve, said annular member surrounding the tube and having a rough inner surface to grip the tube in a positive manner, said annular member being resiliently contractible to grip the tube in response to said cam action.

7. In a coupling assembly to engage the end of a tube, the combination of: a first annular threaded coupling body having a tapered inner circumferential wall to cooperate in the forming of a seal around the tube; a second annular coupling body threaded for engagement with said first body for relative axial movement of the two bodies towards each other by screw action, said two bodies being shaped in the region of their juncture to form with the tube an annular camming chamber around the tube spaced from the tube end, said chamber contracting axially with said screw action; and annular means to surround the tube in said annular chamber inside said tapered inner circumferential wall of said first body, said annular means having an inner circumferential wall portion near its outer end of broken surface configuration to grip said tube in a positive manner in a region spaced from said end of the tube, said annular means being resiliently radially contractible for positive gripping action against said tube by said wall portion and also being resiliently axially contractible between its two ends, the other end of said annular means being engageable with said first body to resist axial contraction of the annular means when the annular means grips the tube, the annular wall of said annular chamber being shaped and dimensioned to engage said annular means with a cam action at an early stage in said screw action to contract the annular means radially into positive grip with the tube end to thereafter contract the annular means axially to force said tube end axially relative to said other end of the annular means for sealing action at said inner circumferential wall, said annular means having its inner end interposed between the end rim of the tube and said first body to serve as a seal therebetween, said annular means comprising a thin-walled sleeve and an annular member abutting the outer end of the sleeve, the outer end of the sleeve being flared and longitudinally slotted for radial expansion to permit said annular member to telescope into the end of the sleeve for axial contraction of the annular means.

8. A combination as set forth in claim 6, in which said annular member is noncircular for gripping contact with said tube at circumferentially spaced points.

9. A combination as set forth in claim 6, in which said annular member has the general configuration of a coil spring.

References Cited in the file of this patent

UNITED STATES PATENTS

| | | |
|---|---|---|
| 1,670,259 | Herlbauer | May 15, 1928 |
| 2,310,744 | Osborn | Feb. 9, 1943 |
| 2,313,323 | Cowles | Mar. 9, 1943 |
| 2,321,260 | Stecher | June 8, 1943 |
| 2,343,922 | Parker | Mar. 14, 1944 |
| 2,351,363 | Parker | June 13, 1944 |
| 2,463,707 | Matousek | Mar. 8, 1949 |
| 2,579,529 | Woodling | Dec. 25, 1951 |
| 2,692,191 | Samiran | Dec. 28, 1954 |
| 2,779,610 | Risley | Jan. 29, 1957 |

FOREIGN PATENTS

| | | |
|---|---|---|
| 75,919 | Sweden | Dec. 14, 1931 |